April 5, 1955     F. P. GRIFFITHS ET AL     2,705,679
PRODUCTION OF POTATO FOOD PRODUCTS
Filed Nov. 15, 1949
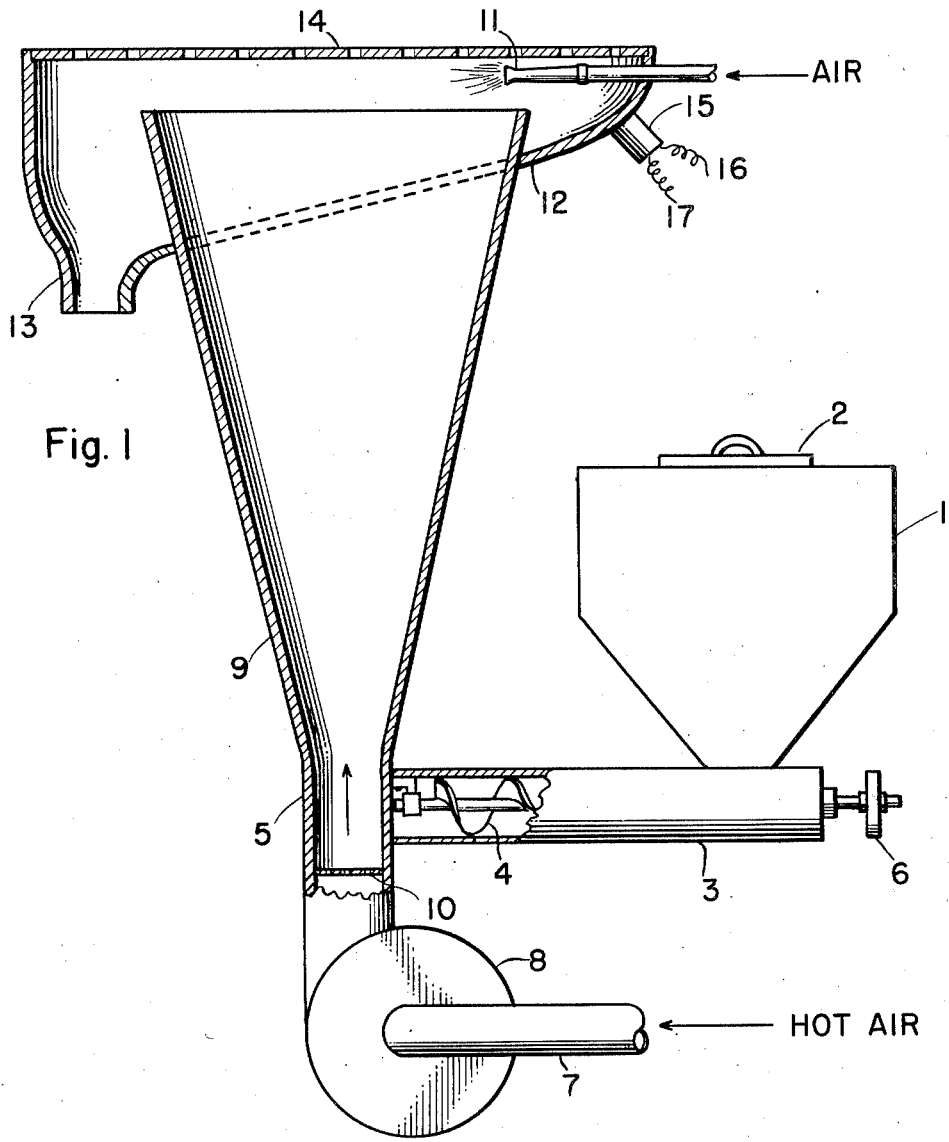
Fig. 1
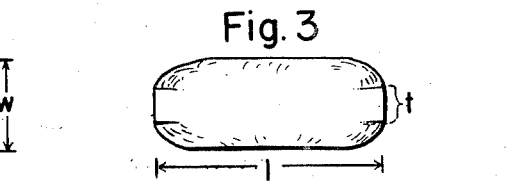
Fig. 2
Fig. 3
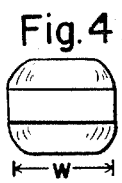
Fig. 4
INVENTORS
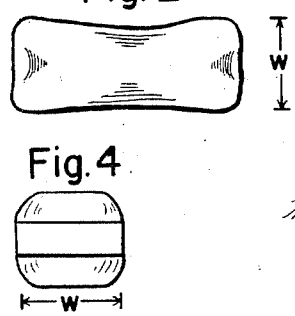

United States Patent Office 2,705,679
Patented Apr. 5, 1955

2,705,679

PRODUCTION OF POTATO FOOD PRODUCTS

Francis P. Griffiths and Paul W. Kilpatrick, Albany, and Winfred O. Harrington, Carl E. Hendel, and Robert L. Olson, Berkeley, Calif., assignors to the United States of America as represented by the Secretary of Agriculture Application November 15, 1949, Serial No. 127,476

3 Claims. (Cl. 99—207)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the processing of foodstuffs, in particular it relates to the preparation of novel food products from potatoes.

It has been found that if potatoes are subjected to a particular type of treatment, as hereinafter described, the potatoes are converted into a food product of unusual properties. Briefly described, the treatment involves subjecting diced potatoes to a hot air stream of sufficient velocity that the potatoes are supported and constantly agitated by the air stream. The conditions during the hot air treatment are so regulated that the potato pieces are each puffed or expanded so as to leave the centers hollow. At the same time the potatoes are cooked, partially dehydrated, and the surfaces of the pieces are browned to an attractive degree. The products so produced are then further subjected to heat, either while suspended in the air stream or in a conventional dehydator, to reduce the moisture content to a degree where the products are self-preserving. During this dehydration the physical dimensions of the potato pieces do not change to any significant extent. The products so produced are very light in weight, being hollow in the center with the sides puffed out much as are the sides of a pillow. Their surfaces are smooth and glazed and their color is tan to golden brown depending on the degree of heat treatment. The texture of the products is crisp and brittle so that they can be eaten directly. The texture of our products is to be contrasted with that of ordinary dehydrated potatoes which are hard, dense and inedible without some softening treatment. The bulk density of the products of this invention is about 6 to 8 cc./gram as compared with less than 4 cc./gram for conventional dehydrated potatoes.

Thus the objects of this invention include the provision of novel potato food products and processes for producing them.

Another phase of this invention relates to apparatus which is particularly adapted to prepare the novel products. Thus another object of the invention is the provision of apparatus useful for such purpose.

One way in which the aforesaid objectives can be readily realized in practice will appear from the following detailed description taken in connection with the attached drawing, wherein:

Fig. 1 is a view, partly in cross-section, of apparatus suitable for preparing the novel food products of this invention; and Figs. 2, 3, and 4 represent views, on an enlarged scale, of the novel food products of this invention.

The novel potato products of this invention are produces as follows:

Potatoes are peeled and then diced, that is, cut up into pieces which may be cubic in shape or which may be in the form of elongated cubes. The size of the dice is of some significance with regard to several factors, namely, appearance of the product, expansion or puffing of the pieces, and rigidity of the products. It has been observed that pieces which are too thick tend to form hard centers whereas pieces which are too thin tend to be fragile and are broken in handling. The particular thickness of the pieces will depend on the variety of potato and the particular conditions of treatment, i. e., temperature, time of treatment and so forth. In general a thickness from about $3/16''$ to about $1/16''$ is suitable. We prefer a thickness of $1/8''$ as yielding products of uniform appearance which are completely hollow yet have sufficient rigidity of structure to withstand handling without undue breakage. The other dimensions (width and length) of the pieces may be varied as desired up to about 1 inch if a product of uniform shape is desired. Pieces larger in size may be used but tend to expand unevenly.

The diced pieces are then preferably blanched to substantially inactivate their enzyme content. Blanching is not essential but is preferable as it improves the appearance of the products, giving them a glazed surface and also it improves the flavor. Blanching is also useful for the introduction of flavoring materials. For example, salt may be added to the water used for blanching whereby the products need not be salted in a later stage of the operations. If blanching is not used the products tend to have a powdery surface that is considered less desirable than the smooth, glazed surface of the product when blanching is employed. In carrying out the blanching any of the usual methods can be used, for example, the diced potatoes may be subjected to steam or immersed in boiling water for a period of about 10 seconds to about 2 minutes.

In the next step, the diced potatoes are subjected to hot air. The purpose of this treatment is to partially dry, cook, and expand the pieces so that they will be substantially hollow. Also during this process the pieces are browned to a desirable depth of color. In carrying out this process it is essential that all the surfaces of the pieces be exposed to the hot air so that the evaporation of moisture from the pieces will be rapid enough to cause the puffing or expanding effect and also so that this effect will be uniform throughout the piece. It is evident that if one surface of a piece is not exposed to the hot air, this surface will not expand to the same extent as the others. To achieve this rapid evaporation and uniform expansion, it is preferred to carry out the heat treatment in the device herein described. In this apparatus the potato pieces are supported and tumbled about by the air stream and thus the desired ends are readily achieved. It is evident however that other types of apparatus could be used. For example, the pieces could be fed into a rotating drum wherein they would be subjected to tumbling while a stream of hot air was passed into the drum through a hollow shaft perforated for its length within the drum. Regardless of the type of apparatus used during this treatment the air temperature should be in the range from about 120° C. to 160° C. Observations have shown that evaporation of moisture is so rapid that the temperature of the potato pieces is only from about 45° C. to about 70° C. during the initial period of heat treatment. The volume of air used should be large, so that rapid expansion of the products takes place before the surface become case-hardened. The quantity of air circulated should be greatly in excess of that which is required to transfer heat to the product and evaporate and remove the moisture. In order to conserve heat, the exhaust air may be re-heated and re-circulated. In general, we use such quantity and velocity of hot air that the pieces are puffed to a volume of about twice their original volume in several minutes, say about 5 to 20 minutes depending on the temperature. Usually the treatment with hot air is continued until the expanded products take on a golden brown color; thus the entire time is from about 20 to about 10 minutes, depending on the temperature used. When the pieces are colored a tan to brown color, their physical shape is set and there is no longer any danger of wrinkling if the air temperature or the air velocity should be decreased.

In order to make a product which is self-preserving it is necessary to reduce the moisture content to less than about 10%. During the treatment above described, the pieces are partially dehydrated but not to a sufficient extent to render them self-preserving. Thus it is necessary to carry out a dehydration step. This dehydration can be carried out in several ways. For example, the temperature of the air stream may be reduced to a range from about 40° C. to about 120° C. and the drying finished at this temperature range. If the initial temperature during the expansion step is in the lower part of the range the entire treatment can be carried out without changing the temperature. Thus if the pieces are subjected to an air stream at 120° C., the entire operation to obtain a finished product can be carried out by subjecting the pieces to this air blast for about 25 minutes. If desired, the pieces which have been cooked, partially dried, expanded and browned by the action of the hot air stream can be removed from the apparatus in which these ends were accomplished and dried in any conventional drier at a reduced temperature, for example from about 40° C. to about 120° C. It is evident that if the higher temperatures within this range are used the color of the pieces may be intensified during the drying step. Thus if one wants to keep the color constant it is advisable to use a lower temperature, for example, from about 40° C. to about 60° C. during drying.

Flavoring materials may be added at several stages in the procedure. One convenient technique is to add the flavoring ingredient to the water in which the potatoes are blanched thereby the flavor will be absorbed by the potatoes. Thus one tasty product is made by adding about 5 to 7% salt to the blanching water. The resulting product is eminently suited for "out-of-hand" munching much as are salted peanuts and are excellent when used as a crouton in soup as they float on the soup and will remain crisp for a longer period of time than will toasted bread, for example. A product which is preeminently suited for eating as a breakfast cereal can be prepared by adding about 6 to 7% sugar and 1% salt to the blanching water. If desired a small amount of malt extract may be added to the blanching water in addition to the sugar and salt since many people prefer breakfast foods with a malt flavor. It is obvious that any other flavoring ingredient can be added to the blanching water for example garlic, onion, monosodium glutamate, vanilla, cheese, spices, extracts, and so forth. The nutritional value of the products may be enhanced by the addition of vitamins, amino acids, mineral salts or other nutrient materials to the blanching water. The natural color of the products can likewise be altered by adding food colors to the blanching water. If desired the flavoring or other additive materials can be added to the potato pieces after blanching by immersing the pieces in a solution or suspension of the flavoring nutritive or coloring material. Further, one may sprinkle these materials if in solid form over the pieces after blanching or at any other stage in the process or apply them with any known coating device. If desired the dry flavoring or other additive materials can be applied to the finished product. Thus if desired the finished products can be mixed with salt or salt and sugar or a mixture of salt and monosodium glutamate. Further, the finished products can be tumbled with a mixture of an edible oil and salt to give them a nut-like flavor. Another means by which the products may be flavored is by introducing volatile flavoring materials in the air stream during the expanding or drying treatment. So, for example, a small proportion of hickory wood smoke may be added to the air stream to give the final products a smoky flavor.

The apparatus which is preferably used for carrying out the hot-air treatment is shown in Fig. 1. This apparatus and its functions are described as follows:

The diced, blanched potatoes are placed in hopper 1. This hopper is provided with a lid 2 adapted to prevent bypassing of air out through hopper 1. The diced potatoes are fed from hopper 1 through pipe 3 into pipe 5 by means of screw conveyor 4. Screw 4 is rotated through pulley 6 by any suitable means such as an electric motor equipped with a speed regulation device. Pipe 7 is connected with a source of hot air (not illustrated) and with air-blower 8 whereby the hot air is forced up pipe 5 and cone 9. A screen, 10, is provided to prevent entry of the potatoes into air-blower 8 if the air pressure drops. The diced potatoes entering pipe 5 meet the blast of hot air rising through pipe 5 and cone 9. This hot air causes the potato pieces to tumble about in the air stream and puffing, partial drying, cooking, and browning take place in a short time. As these changes occur, the particles become less dense whereby as they reach completion they rise higher and higher in cone 9. Thus by control of air velocity and temperature, the potato pieces are properly modified by the time they rise to the top of cone 9. A nozzle, 11, is provided near the top of cone 9. This nozzle is connected with a source of compressed air whereby as the finished pieces rise to the top of cone 9 they are blown into circular receiver 12. This receiver has a bottom which slopes toward spout 13 so that the potato pieces falling into it will flow out spout 13. An electromagnetic vibrator 15 is positioned on receiver 12 to assist the flow of the product down to spout 13. Wires 16 and 17 are provided for connection of the vibrator to a suitable source of pulsating direct current. A screen 14 is provided at the top of receiver 12. This screen permits passage of the air blast but prevents loss of the potato pieces. This screen is removable so that the interior of cone 9 can be cleaned. Since the potato pieces rise through cone 9 as they are processed, room is thus provided in pipe 5 for further entry of raw potato cubes. Thus the device can be operated continuously by regulating the introduction of raw cubes to equal the rate of discharge of the finished product and by regulating the air temperature and velocity so that the products being discharged are properly modified. It is obvious that though the device heretofore described is particularly adapted for treating potatoes in accordance with the process of this invention, it can also be used for subjecting any type of food product or other material to a blast of hot air for the purpose of blanching, cooking, or dehydrating the material. Thus, for example, the device can be used to subject diced carrots or diced sweet potatoes to a blast of heated air in order to prepare partially dried, puffed food products.

Typical products produced in accordance with this invention are shown on an enlarged scale in Figs. 2, 3, and 4. Fig. 2 is a plan view while Figs. 3 and 4 are a longitudinal and a side view, respectively. In these figures, $t$, $w$, and $l$ represent the thickness, width, and length of the original raw potato piece. It is obvious from these figures that the original width and length of the raw pieces are substantially retained whereas the thickness increases about 2½ times.

The following examples are given as illustrative embodiments of several manners in which this invention may be carried out in practice.

*Example I*

A batch of Netted Gem Russet potatoes was peeled, diced into pieces ⅛" x ⅜" x 1", washed and blanched for 1 minute in boiling 7% salt solution. The blanched pieces were introduced into a device similar to that shown in Fig. 1 herein. In this device the cone was 20" long and its large diameter was 14" and its small diameter was 8". Air was introduced at a velocity of about 500 ft./min. The rate of feed of the blanched pieces and the temperature of the air stream were so controlled that the pieces were subjected to air at a temperature of 120° C. for 10 minutes, then air at a temperature of 145° C. for 6 minutes. At the end of this period the pieces were noted to be uniformly expanded and of a golden brown color. This product was then removed from the apparatus and dried in an oven at a temperature of 50° C. until the moisture content was 5%. The finished products had a bulk density of 7.6 cc./gram, had an attractive golden brown color and were crisp. Samples were cut open with a knife and found to be hollow.

*Example II*

A batch of Netted Gem Russet potatoes was peeled, diced into pieces ⅛" x ⅜" x 1", washed and blanched for 1 minute in boiling 7% salt solution. The blanched pieces were introduced into a device similar to that shown in Fig. 1 herein. In this device the cone was 20" long, its large diameter was 14" and its small diameter was 3". Air at a temperature of 125° C. was introduced at a velocity of about 500 ft./min. The conditions were so regulated that the pieces remained in the device for 25–29 minutes. The resulting products required no further dehydration. As in Example I, the products were golden brown in color, of crisp texture with hollow centers. The bulk density of the product was 6.83 cc./gram.

*Example III*

A batch of diced potatoes (⅛" x ⅜" x ⅜") was blanched for 1 minute in boiling 7% salt solution. The blanched potatoes were divided into two samples. One sample was treated in the device as described in Example I with an air temperature of 150°–160° C. for 8 minutes. The treated products were then dried to 5% moisture in an oven at 50° C. The other sample was treated in the device as described in Example I with an air temperature of 140° C. for 5 minutes and then with an air temperature of 125° C. for 14 minutes, the longer period at the lower temperature being employed to finish the dehydration. In both cases excellent products were produced having the same properties as with the product of Example I.

Having thus described our invention, we claim:

1. A process for preparing ready-to-eat food products which comprises establishing an upwardly directed stream of air heated to a temperature from about 120° C. to about 160° C., feeding diced potatoes into the base of said stream, the velocity of said stream being such that the dice are tumbled about and suspended by the air stream whereby the dice are uniformly expanded into hollow shells by the rapid evaporation of moisture and are further cooked and at least partially dried by the action of the air stream, and removing the products which rise to the top of the air stream as their density decreases due to the aforementioned changes in shape and composition.

2. The process of claim 1 wherein the products are subjected to dehydration in air at a temperature from about 40° C. to about 120° C. until their moisture content is less than 10%.

3. A process for preparing ready-to-eat food products which comprises cutting raw potatoes into dice having a thickness from 1/16 inch to 3/16 inch, blanching the dice in boiling salt water for about one minute, feeding the blanched dice into the base of an upwardly directed air stream heated to a temperature from about 120° C. to about 160° C., the velocity of the air stream being such that the dice are tumbled about and suspended by the air stream whereby the dice are uniformly expanded into hollow shells by the rapid evaporation of moisture and are further cooked and at least partially dehydrated by the action of the air stream, the dice being subjected to the action of the air stream about 5 to about 20 minutes, removing the hollow potato shells which rise to the top of the air stream as their density decreases due to the aforementioned changes in shape and composition, then subjecting them to dehydration in air at a temperature from about 40° C. to about 120° C. until their moisture content is less than about 10%.

References Cited in the file of this patent

UNITED STATES PATENTS

| 648,248 | Edwards | Apr. 14, 1900 |
| 2,005,238 | Peebles | June 18, 1935 |
| 2,101,506 | Morrow et al. | Dec. 7, 1937 |
| 2,386,052 | Lundy | Oct. 2, 1945 |
| 2,401,392 | Ware et al. | June 4, 1946 |
| 2,419,875 | Birdseye | Apr. 29, 1947 |